(12) United States Patent
Tsuda et al.

(10) Patent No.: US 7,596,389 B2
(45) Date of Patent: Sep. 29, 2009

(54) MOBILE COMMUNICATION TERMINAL, METHOD FOR CONTROLLING EXECUTION STATE OF APPLICATION PROGRAM, APPLICATION PROGRAM, AND RECORDING MEDIUM WHEREIN APPLICATION PROGRAM HAS BEEN RECORDED

(75) Inventors: Masayuki Tsuda, Tokyo (JP); Takefumi Naganuma, Kyoto (JP); Hideyuki Nagasawa, Kanagawa (JP); Eriko Oseki, Kanagawa (JP); Fukiko Maeda, Kanagawa (JP); Nobuyuki Watanabe, Saitama (JP); Mao Asai, Kanagawa (JP); Takashi Kondo, Tokyo (JP); Kazuhiro Yamada, Kanagawa (JP); Dai Kamiya, Chiba (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 10/496,787

(22) PCT Filed: Dec. 5, 2002

(86) PCT No.: PCT/JP02/12778

§ 371 (c)(1),
(2), (4) Date: Jun. 4, 2004

(87) PCT Pub. No.: WO03/049412

PCT Pub. Date: Jun. 12, 2003

(65) Prior Publication Data

US 2005/0054372 A1    Mar. 10, 2005

(30) Foreign Application Priority Data

Dec. 7, 2001    (JP)    ............................. 2001-374617

(51) Int. Cl.
*H04M 1/00*    (2006.01)
(52) U.S. Cl. .................. 455/566; 455/574; 455/418; 455/556.1; 455/575.1; 455/550.1; 713/324
(58) Field of Classification Search .............. 455/514, 455/566, 550.1, 418–419, 414.1, 572, 574; 713/324; 345/102
See application file for complete search history.

(56) References Cited

U.S. PATENT DOCUMENTS 5,552,806 A * 9/1996 Lenchik ...................... 345/156

(Continued)

FOREIGN PATENT DOCUMENTS

EP    0 230 351    7/1987

(Continued)

OTHER PUBLICATIONS

U.S. Appl. No. 10/497,657, filed Jun. 4, 2004, Tsuda et al.

(Continued)

*Primary Examiner*—Sharad Rampuria
(74) *Attorney, Agent, or Firm*—Oblon, Spivak, McClelland, Maier & Neustadt, L.L.P.

(57) ABSTRACT

In the mobile telephone 1 relating to the present invention, a control section 2 performs control for switching between a non-active state which refuses inputs to an application program, and a rest state in which the application program is temporarily halted. The control section 2 performs control for switching the execution state of the application program from the non-active state to the rest state, in accordance with instructions from an input section 3. The control section 2 further performs control for switching the execution state of the application program from the non-active state to the rest state, in accordance with a function contained in an application program.

21 Claims, 7 Drawing Sheets

U.S. PATENT DOCUMENTS

| | | | | |
|---|---|---|---|---|
| 5,881,377 | A * | 3/1999 | Giel et al. | 455/343.1 |
| 5,905,900 | A * | 5/1999 | Combs et al. | 713/320 |
| 5,918,301 | A * | 6/1999 | Hasebe | 84/604 |
| 5,928,365 | A * | 7/1999 | Yoshida | 713/324 |
| 5,949,812 | A * | 9/1999 | Turney et al. | 375/130 |
| 6,131,046 | A * | 10/2000 | Sano et al. | 455/566 |
| 6,138,032 | A * | 10/2000 | Hill et al. | 455/517 |
| 6,144,865 | A | 11/2000 | Pichard | |
| 6,157,849 | A * | 12/2000 | Cho | 455/566 |
| 6,169,911 | B1 * | 1/2001 | Wagner et al. | 455/566 |
| 6,182,231 | B1 * | 1/2001 | Gilgen | 713/324 |
| 6,198,939 | B1 * | 3/2001 | Holmstrom et al. | 455/566 |
| 6,278,887 | B1 * | 8/2001 | Son et al. | 455/566 |
| 6,317,614 | B1 * | 11/2001 | Okada | 455/574 |
| 6,381,448 | B2 * | 4/2002 | Narusawa | 455/133 |
| 6,414,675 | B1 * | 7/2002 | Shen | 345/211 |
| 6,418,310 | B1 * | 7/2002 | Dent | 455/418 |
| 6,456,857 | B1 * | 9/2002 | Bos et al. | 455/550.1 |
| 6,463,278 | B2 * | 10/2002 | Kraft et al. | 455/418 |
| 6,522,894 | B1 * | 2/2003 | Schmidt | 455/552.1 |
| 6,597,895 | B1 * | 7/2003 | Maeda | 455/88 |
| 6,631,192 | B1 * | 10/2003 | Fukiharu | 379/433.07 |
| 6,725,064 | B1 * | 4/2004 | Wakamatsu | 455/566 |
| 6,829,494 | B2 * | 12/2004 | Tanabe | 455/574 |
| 6,928,300 | B1 * | 8/2005 | Skinner et al. | 455/556.2 |
| 6,967,657 | B2 * | 11/2005 | Lowles et al. | 345/472 |
| 7,069,044 | B2 * | 6/2006 | Okada et al. | 455/556.1 |
| 7,349,688 | B2 * | 3/2008 | Tsuda et al. | 455/418 |
| 7,523,326 | B2 * | 4/2009 | Miyazaki | 713/320 |
| 2001/0018364 | A1 | 8/2001 | Watanabe | |
| 2002/0072359 | A1 * | 6/2002 | Moles et al. | 455/425 |
| 2002/0086645 | A1 * | 7/2002 | Flegeo | 455/90 |
| 2002/0183051 | A1 * | 12/2002 | Poor et al. | 455/418 |

FOREIGN PATENT DOCUMENTS

| | | |
|---|---|---|
| JP | 10-136064 | 5/1998 |
| JP | 10-295932 | 11/1998 |
| JP | 10-295932 | 11/1998 |
| JP | 2000-4197 | 1/2000 |
| JP | 2001-274918 | 10/2001 |
| JP | 2001-517890 | 10/2001 |
| JP | 2001-333153 | 11/2001 |
| JP | 2001333153 A * | 11/2001 |
| JP | 2002-320016 | 10/2002 |
| JP | 2003-6092 | 1/2003 |
| JP | 2003-8698 | 1/2003 |

OTHER PUBLICATIONS

U.S. Appl. No. 10/496,787, filed Jun. 4, 2004, Tsuda et al.

* cited by examiner

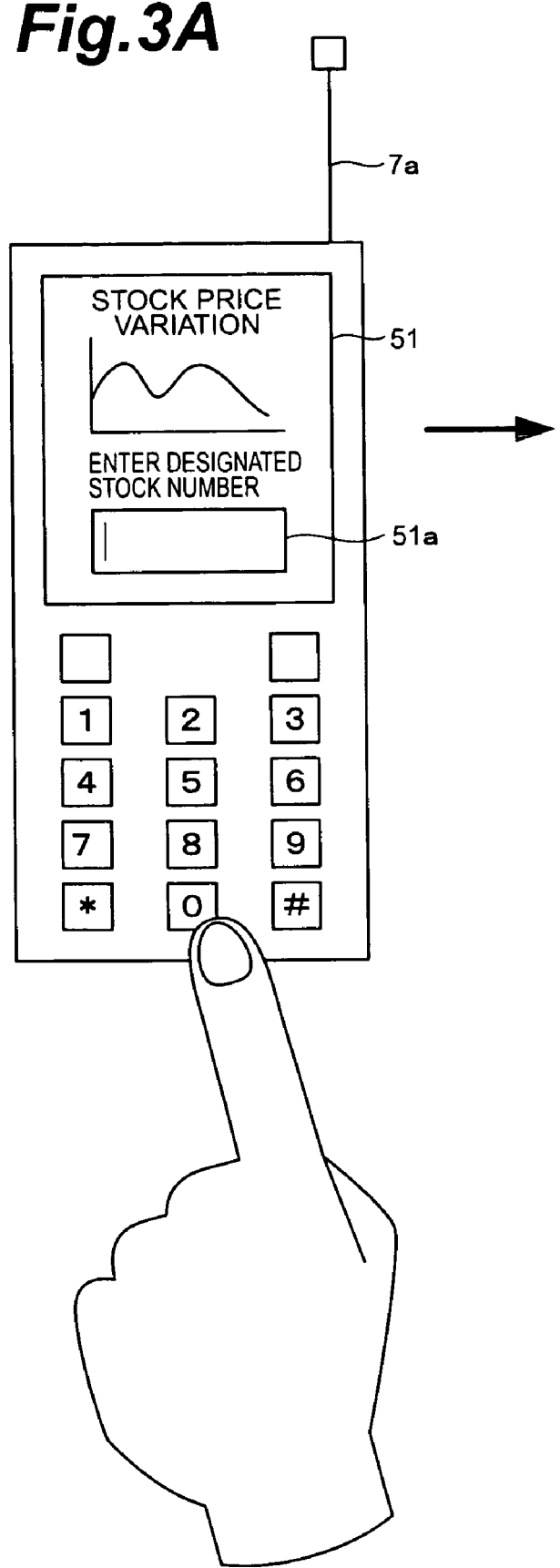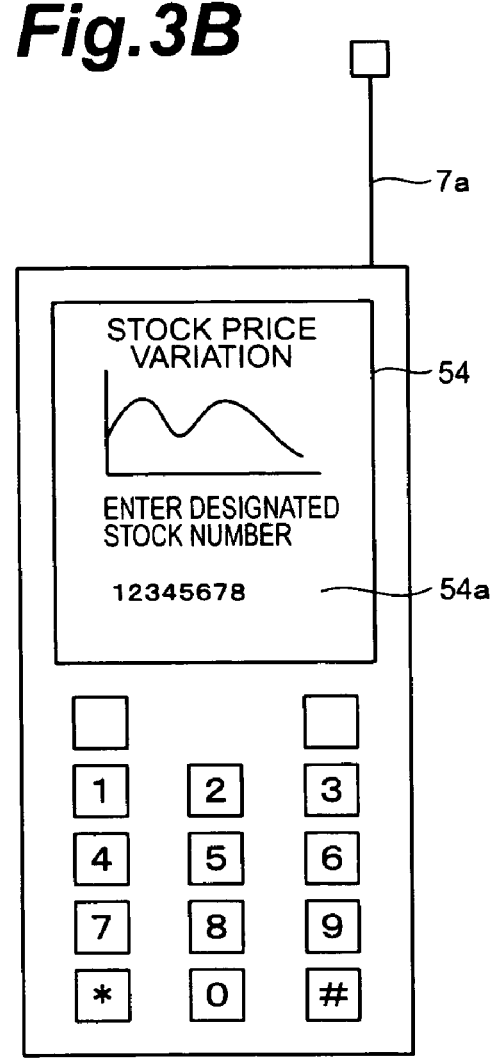

*Fig.4A* *Fig.4B*
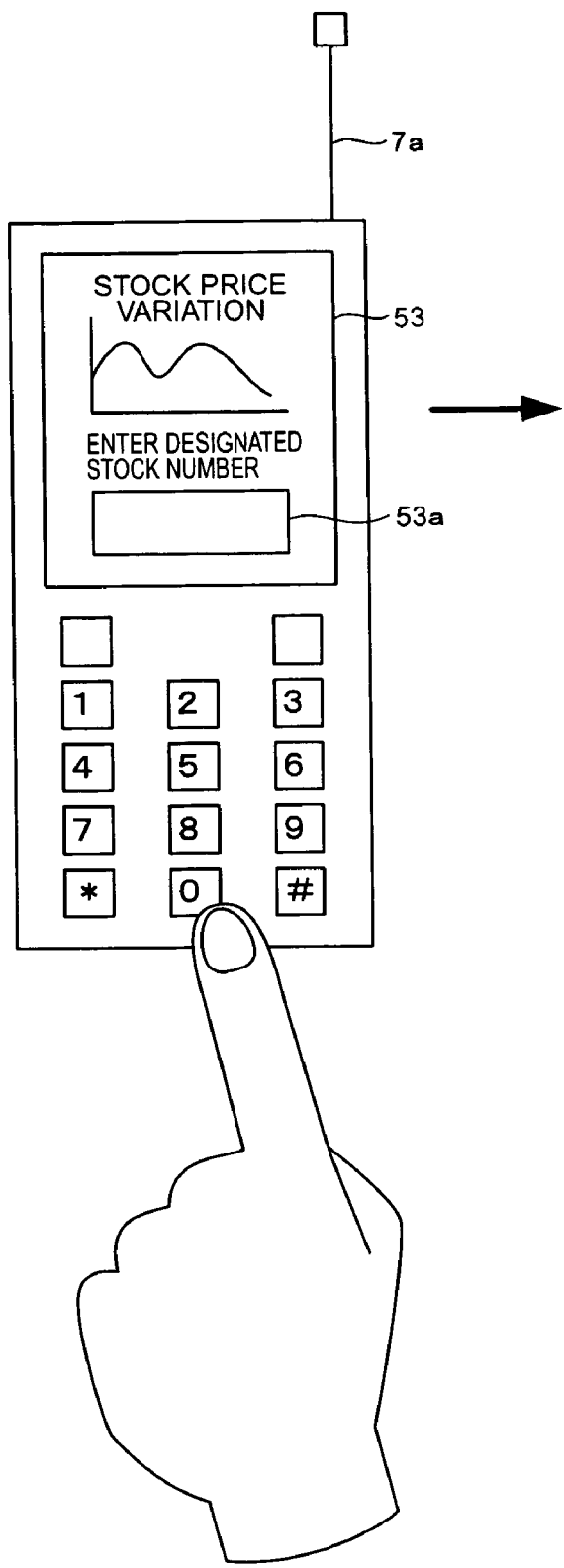

*Fig.5A*         *Fig.5B*
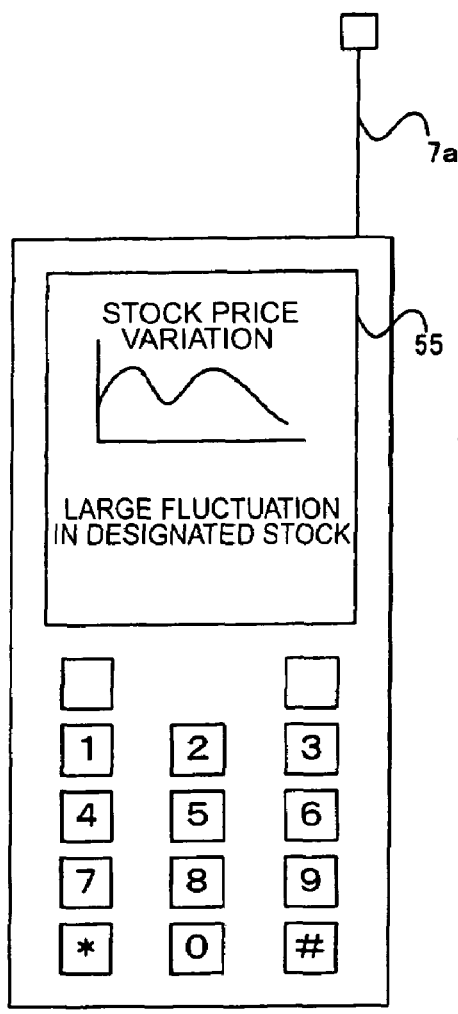 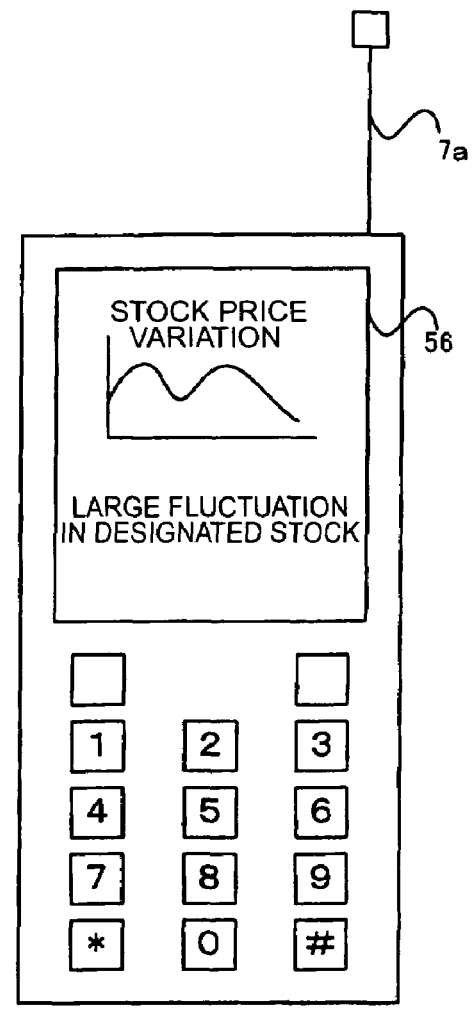

MOBILE COMMUNICATION TERMINAL, METHOD FOR CONTROLLING EXECUTION STATE OF APPLICATION PROGRAM, APPLICATION PROGRAM, AND RECORDING MEDIUM WHEREIN APPLICATION PROGRAM HAS BEEN RECORDED

TECHNICAL FIELD

The present invention relates to a mobile communications terminal, application program execution state control method, application program, and storage medium storing application programs.

BACKGROUND ART

Conventionally, resident application programs have been developed as application programs which can be executed on a mobile communications terminal, principally mobile telephones. A resident application program is automatically started up when the power supply is turned on, and it continues in an active state until the power supply is switched off or until the user shuts it down. Examples of residential application programs include, for example, application programs for displaying a standby screen for awaiting a telephone call or incoming electronic mail (hereinafter, called "standby screen").

DISCLOSURE OF THE INVENTION

However, a resident application may also be executed for a long period of time and use moving image data. In cases of this kind, the power consumption of the mobile communications terminal is particularly high. Therefore, if the application program is temporarily closed down in order to reduce power consumption, then in order to restart the application, an operation performed by the user for selecting and executing the application, and time, are required. Moreover, the temporarily closed down application program does not reflect the execution state when it was closed down, but rather, specific operations and time are also required in order to return it to the display screen when it was closed down.

In order to resolve these problems, a method has been devised wherein a power saving state (sleep state) is assigned to the OS (Operating System) of the mobile communications terminal, and the execution state of the application program is controlled. However, if the execution state is controlled via the OS, it may occur that the application program halts or terminates irrespectively of the execution state. Therefore, in some cases, it may not be possible to execute the actual processing of the application program. Furthermore, if the application program is transferred to a power saving state by the OS, then there is no way for the application program to restore itself independently.

The present invention was devised in view of the foregoing, an object thereof being to provide a mobile communications terminal, application program execution state control method, application program and storage medium storing an application program whereby power consumption can be reduced whilst maintaining usability.

The mobile communications terminal relating to the present invention is characterized in comprising control means for performing control for switching between a normal execution state of an application program, and a rest state in which said application program is temporarily halted.

The application program execution state control method relating to the present invention is an application program execution state control method whereby a mobile communications terminal controls the execution state of an application program stored in said mobile communications terminal, characterized in comprising a control step for performing control, whereby the mobile communications terminal switches between a normal execution state of said application program, and a rest state in which said application program is temporarily halted.

The application program relating to the present invention is an application program which is executed in a mobile communications terminal and the execution state of which is controlled by said mobile communications terminal, characterized in comprising functions for switching between a normal execution state of said application program and a rest state in which said application being executed is temporarily halted.

According to these inventions, control is executed for switching between a normal execution state and a rest state for temporarily halting the application program. Since an application program in a rest state is not closed down, it can be returned to a normal execution state without requiring labour for restarting the application. Moreover, in the rest state, the power consumption of the mobile communications terminal is lower than in a normal execution state. Consequently, it is possible to reduce power consumption whilst maintaining the usability of the mobile communications terminal.

Furthermore, in contrast to control implemented via the OS, the execution state of the resident application is controlled in accordance with a function contained in the resident application itself. Therefore, the resident application is not halted or closed down, irrespectively of the execution state thereof. Moreover, in contrast to a case where the application is transferred to a power saving state by the OS, it is possible for the resident application to return from the rest state, independently.

Desirably, the mobile communications terminal relating to the present invention further comprises instructing means for instructing a state transition between said normal execution state and said rest state, said control means executing control for switching the execution state of said application program between the normal execution state and the rest state, in accordance with said instructions from said instructing means.

Desirably, the application program execution state control method relating to the present invention further comprises an instructing step for instructing a state transition of said mobile communications terminal between said normal execution state and said rest state, and in said control step, control is executed for switching the execution state of said application program between the normal execution state and the rest state, in accordance with said instructions from said instructing step.

Desirably, the application program relating to the present invention comprises functions for switching the execution state between the normal execution state and the rest state, on the basis of state transition instructions input between a normal execution state and a rest state.

According to these inventions, it is possible for the user readily to transfer the execution state of an application program, by means of a simple operation, such as pressing a switch key, or the like. In other words, it is possible readily to perform switching of the application program between an execution state having low power composition and an execution state having high power consumption, whilst maintaining an execution state in which the basic telephone functions, such as call origination processing, and the like, can be used instantly. Consequently, it is possible to achieve a carefully conceived energy-saving telephone which matches the desires of the user, whilst maintaining the convenience of use of the mobile communications terminal.

Desirably, the mobile communications terminal relating to the present invention is characterized in that said control means performs control for switching the execution state of said application program between the normal execution state and the rest state in accordance with a function contained in said application program.

Desirably, the application program execution control method relating to the present invention is characterized in that, in said control step, control is executed for switching the execution state of said application program between a normal execution state and a rest state, in accordance with a function contained in said application program.

According to these inventions, it is not necessary for the user to perform operations for switching the mobile communications terminal between an execution state in which an application program can be used instantly, and an execution state having low power consumption. Therefore, it is possible to prevent wasteful power consumption of the mobile communications terminal over a long period of time, even in cases where the user has not instructed a transfer to the rest state.

Furthermore, if a storage medium storing an application program as described above is sold or distributed, independently or as a peripheral product, then it is possible to implement the execution state control technology relating to the present invention, inexpensively, over a broad range.

Desirably, the mobile communications terminal relating to the present invention is characterized in that, in said rest state, said control means allows execution of a native application which is different to said application.

Desirably, the execution state application program relating to the present invention is characterized in that said control step allows execution of a native application that is different to said application.

By this means, it is possible for the user to use the basic telephone, mail and browsing functions of the mobile communications terminal, appropriately, even if the application program is in a rest state.

BRIEF DESCRIPTION OF THE DRAWINGS

FIG. 3A is a diagram showing an example of a display screen before key input in an active state;

FIG. 3B is a diagram showing an example of a display screen after key input in an active state;

FIG. 4A is a diagram showing an example of a display screen before key input in a non-active state;

FIG. 4B is a diagram showing an example of a display screen after key input in a non-active state;

FIG. 5A is a diagram showing an example of a display screen before transition to a rest state;

FIG. 5B is a diagram showing an example of a display screen after transition to a rest state;

BEST MODES FOR CARRYING OUT THE INVENTION

Figure 1:
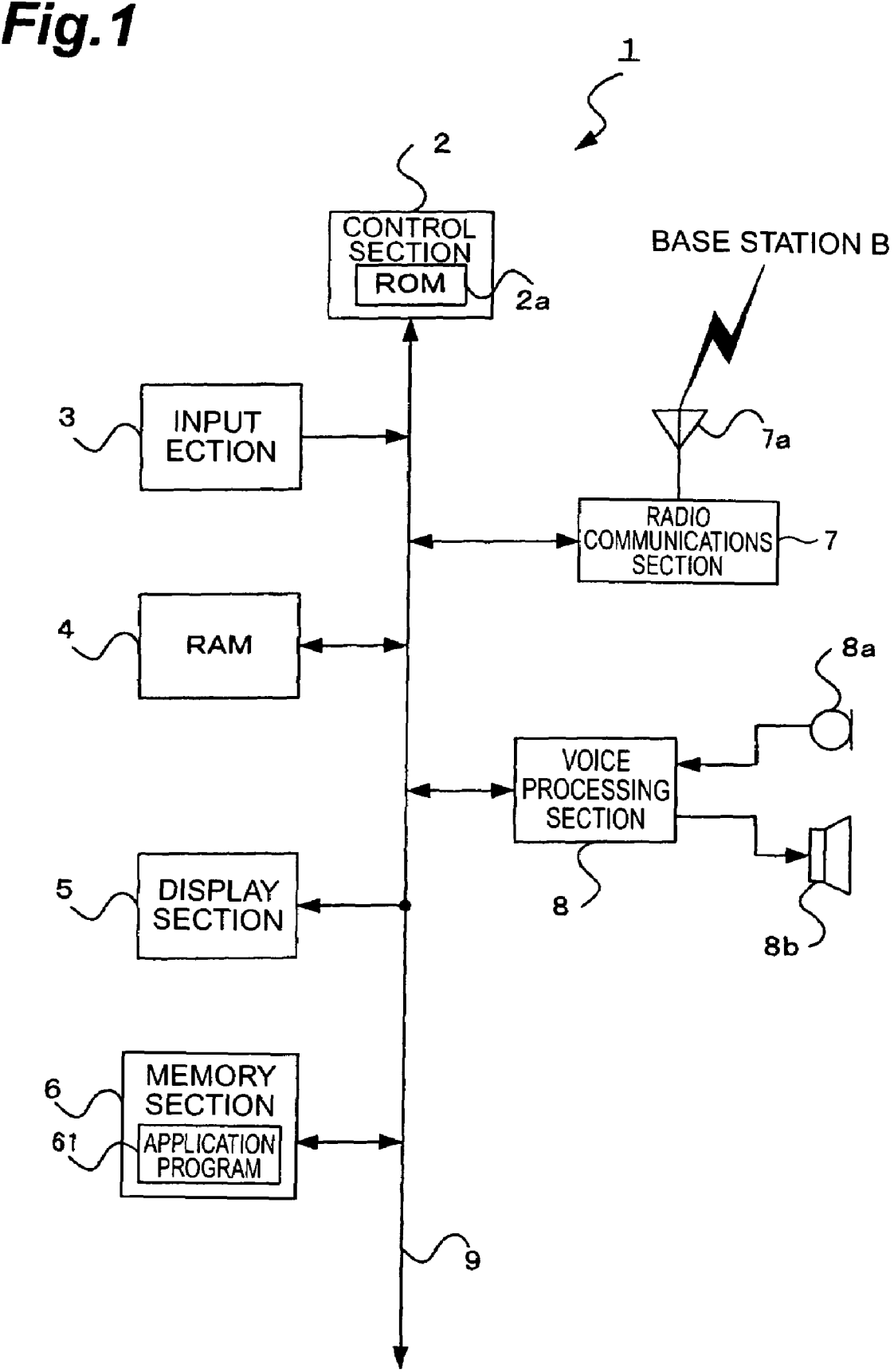
FIG. 1 is a block diagram showing the functional composition of a mobile telephone.

Below, embodiments of the present invention are described with reference to the accompanying drawings. Firstly, the composition of the invention will be described. FIG. 1 is a block diagram showing the functional composition of a mobile telephone 1. As shown in FIG. 1, the mobile telephone 1 (corresponding to a mobile communications terminal), is constituted by a control section 2 (corresponding to control means), an input section 3 (corresponding to instruction means), a RAM 4, a display section 5, a memory section 6, a radio communications section 7, and a voice processing section 8, each section being connected via a bus 9 in such a manner that various types of signals can be input and output to and from same.

The control section 2 has a built in ROM (Read Only Memory) 2a, reads a program previously stored in the ROM 2a, opens it into the RAM 4, and controls each section centrally in accordance with the program. In other words, the control section 2 executes various types of processing in accordance with input signal from the input section 3 and the program opened in the RAM 4, and the results of this processing are stored temporarily in the RAM 4 and also displayed on the display section 5. The processing results stored in the RAM 4 are also stored in a prescribed region of the memory section 6, according to requirements.

The input section 3 comprises various operating keys which instruct operations, such as switching on of the power supply, selection and execution of an application program, switching to a execution state, as described hereinafter, setting a rest time, as described hereinafter, or the like, and each of these respective operating keys outputs an input signal corresponding to the instruction content, to the control section 2, by means of the keys being pressed independently or jointly.

The RAM (Random Access Memory) 4 is constituted by a semiconductor, or the like, and temporarily stores programs read from the ROM 2a or data read from the memory section 6, in each of the various processes executed by the control section 2. For example, when executing the execution state transition processing described hereinafter, the RAM 4 stores data relating to the rest time and time settings specified by the control section 2. Moreover, the RAM 4 stores the display data when transfer to the rest state, described hereinafter.

The display section 5 is constituted by an LCD (Liquid Crystal Display) or EL (Electro Luminescence) display, or the like, and displays display data in a prescribed region in accordance with signals input from the control section 2. The display data is data used as the application program is executed, and it includes not only static image data, but also moving image data for elements such as a stock price board, games, or the like.

The memory section 6 is constituted by a volatile semiconductor memory, such as an EEPROM (Electrically Erasable and Programmable ROM), or the like, and it stores data required by the control section 2 in order to execute various processes, and data generated as a result of executing processes, and the like. Moreover, the memory section 6 stores application programs 61 and ADFs (Attribute Definition Files), in a mutually corresponding fashion. An ADF is a file consisting of data relating to the attributes of an application program 61. The data relating to attributes is, for example, data indicating that the application program 61 has an execution state transition function (My Concierge key). The application program 61 may be stored in a storage medium, such as an IC card, or the like, which can be inserted into and removed from the mobile telephone 1.

The radio communications section 7 is a circuit having a modulating and demodulating section (not illustrated) for modulating and demodulating signals, and an encoding and decoding section (not illustrated) for encoding and decoding signals, and it is also provided with an antenna 7a. The antenna 7a is provided in an extendable and retractable fashion with respect to the upper part of the casing of the mobile telephone 1, and it sends and receives data to and from a base station B.

When receiving, the modulating and demodulating section performs processing for demodulating signals input via the antenna 7a, into signal which can be processed by the encoding and decoding section. On the other hand, when transmitting, it performs processing for modulating digital signals converted by the encoding and decoding section into signal which can be transmitted by radio waves. Moreover, the encoding and decoding section is constituted by a codec, and when receiving, it performs processing (decoding) for converting digital signals input from the modulating and demodulating section into analogue signals. On the other hand, when transmitting, it performs processing (encoding) for converting analogue signals, such as voice signals, into digital signals, and compressing the converted digital signals into a data volume that is suitable for transmission.

The voice processing section 8 comprises a converter and an amplifier, and the like, and is also provided with a microphone 8a, and speaker 8b. During a call, the voice processing section 8 converts voice data input via the control section 2 into an analogue signal, by means of the converter, passes the signal via the amplifier and emits it from the speaker 8b. Furthermore, during a call, the voice processing section 8 converts a voice signal input via the microphone 8a into a digital signal suitable for radio transmission, by means of the converter, and outputs the converted signal to the radio communications section 7.

Next, the operation of the present embodiment will be described with reference to FIG. 2. As a basic premise in the description of the operation, in order to distinguish clearly between an application program having an execution state transition function, and an application program for realizing basic functions of the mobile telephone 1 (telephone function, mail function, browsing function, and the like), the former is called "resident application" and the latter is called "native application".

Figure 2:
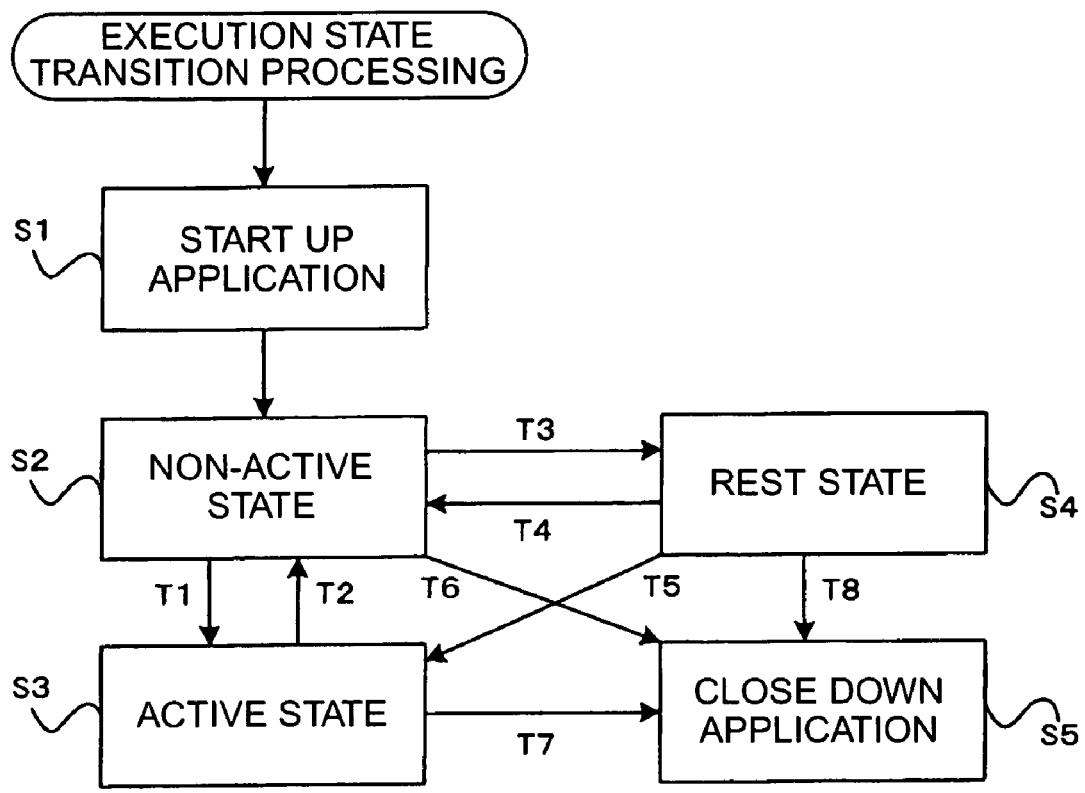
FIG. 2 is a state transition diagram showing the execution state transmission processing.

FIG. 2 is a state transition diagram for describing the execution state transition processing. As shown in FIG. 2, the mobile telephone 1 is switchable between three execution states of the resident application, namely, non-active state, active state and rest state. Moreover, the non-active state and active state are together termed "normal execution states".

The non-active state is an execution state which rejects key inputs to the resident application. These inputs include indirect inputs made by selecting software keys displayed on the display section 5. In the non-active state, the resident application performs display operations and data transmission and reception, updating, and the like, by means of radio communications, similarly to a conventional standby screen. Moreover, these display operations also include updating of display data. Furthermore, in the non-active state, processing for reception of key events (process commands implemented by the control section 2 on the basis of key inputs) and display of software keys is not performed by the resident application, but is only performed by the native application.

The active state is an execution state which permits key inputs to the resident application. In the active state, the resident application executes all processing in order to realize the functions thereof. In other words, in the active state, processing for reception of key events and display of software keys, and the like, is executed by the resident application only.

Furthermore, it is possible to implement a setting whereby, in the active state, if a signal is received indicating reception of a mail by the mobile telephone 1 from the base station B, then the native application only displays on the display section 5 a pictogram indicating that a mail has been received, but does not perform reception of the mail contents from the mail server.

The rest state is an execution state where the resident application is halted temporarily. In the rest state, the resident application waits for a key event which indicates transition to a non-active state or active state. In other words, in the rest state, the resident application does not execute any processing, such as reception of key events, display operations, or the like, except for a state transmission instruction, and processing is executed by the native application only. The display operations include updating of display data. For example, in a resident application displaying an animated standby screen, or the like, the display data during rest state becomes static image data, and the application functions only as a wallpaper display. Therefore, the mobile telephone 1 is able to achieve lower power consumption than in the non-active state. In the rest state, software such as KVM (K Virtual Machine) and JAM (Java Application Manager), and the like, of the resident application also halts.

Moreover, in the rest state, if a signal is received indicating reception of a mail from base station B by the mobile telephone 1, then the native application is able to receive the contents of the mail automatically from the mail server. In this way, by applying a difference to the operation of the native application when a signal indicating reception of a mail is received from base station B, in the active state and the rest state, it is possible to prevent execution of a resident application from being obstructed each that time a mail is received, when a resident application, such as a game, or the like, has been activated, and furthermore, it is possible to receive mail automatically when the game, or the like, has been interrupted and the resident application, or the like, is in a rest state.

Below the execution state transition processing is described in detail. Firstly, when the execution of a resident application is instructed via the input section 3, then the control section 2 reads out and starts up the resident application from the memory section 6 (S1). Upon starting up, a notification indicating that the application is a resident application having an execution state transition function is sent to the control section 2. This notification processing is performed by means of the control section 2 consulting the My Concierge key of the ADF stored in the memory section 6.

The resident application may be started up automatically when the mobile telephone 1 has entered a standby state (hereinafter, called "standby start-up"). This standby start-up is only executed when the ADF contains a My Concierge key and the standby setting has been made on the menu.

In the present embodiment, an application for displaying a moving image standby screen is supposed as the resident application, and the execution state immediately after start-up is taken to be a non-active state (S2).

The state transition from non-active state to active state (T1) is executed by the control section 2 on the basis of an execution state switching instruction from the input section 3. Thereby, the user is able readily to cause the resident application to transfer from a non-active state to an active state, by means of a simple operation, such as pressing a switch key, or the like. In other words, it is possible readily to implement switching of the resident application to an execution state which permits input, whilst maintaining the native application in an execution state in which it is immediately usable. Moreover, the state transition in T1 may be executed by the control section 2 in accordance with a function contained in the resident application.

Furthermore, the processing implemented consecutively after the state transition in T1 is as follows. This processing includes, for example, display of a ticker (indicator board with flowing and flashing text), playing back of media resources, such as sound and images, and the like, operation of a timer, HTTP (Hyper Text Transfer Protocol) communications, access to a scratch pad (region where data created by an application or data received via the network is saved), operation of the vibrator, switching on and off of the backlight, and the like.

The state transition (T2) from active state to non-active state is performed automatically by the control section 2 on the basis of a function (for example, "deactivate") contained in the resident application. For example, since a resident application for displaying an animated standby screen, or the like, has a low input frequency in comparison to the monitoring frequency, it is suitable for this application to continue in a non-active state unless the user executes a switching instruction. On the other hand, in the case of a native application, the input frequency is generally higher than that of a resident application, and therefore it is suitable for the active state of a native application to be continued as long as possible. Therefore, key inputs to a native application are treated preferentially, by automatically switching the execution state of the resident application from an active state to a non-active state. The state transition illustrated in T2 may be performed by the control section 2 on the basis of an execution state switching instruction from the input section 3.

The processing that is continuously executed even after the state transition in T2, includes, for example, display of a ticker, playing back of media resources, such as sound and images, and the like, operation of a timer, HTTP communications, access to a scratch pad, operation of the vibrator, switching on of the backlight, switching off of the backlight, and the like.

The state transition from a non-active state to a rest state (T3) is executed automatically by the control section 2, on the basis of a function (for example, "sleep") contained in the resident application. In the rest state, the display screen shown at the time of the state transition from non-active state to rest state is displayed continuously on the display section 5. In other words, the display data in the rest state is static image data, which does not change over time. Moreover, the state transition at T3 can be performed by control section 2 on the basis of an execution state switching instruction from the input section 3.

The processing halted by the resident application after the state transition in T3 is as described below. Specifically, the operations which are halted are the display of the ticker scroll section (the display of the ticker itself continues), the playing back of media resources, operation of the timer, and operation of the vibrator. Furthermore, HTTP communications are disconnected. During writing of data to the scratchpad, the state transfers to a rest state after writing has completed. During reading of data from the scratchpad, the state transfers directly to a rest state. The switching on and switching off of the backlight are conducted similarly to a non-active state. In other words, if the backlight was switched on in the non-active state then it will remain turned on, and if the backlight was switched off in the non-active state, then it will remain turned off.

The state transition (T4) from rest state to non-active state is executed by the control section 2 when a prescribed condition is satisfied. In the case that the mobile telephone 1 is a folding type or flip-type portable phone, then the prescribed condition is the operation of opening the call section of the casing. Alternatively, the condition may be the elapsing of a rest time (for example, 5 minutes) set in the active state, or the reaching of a set time (for example, 17:00) according to the timer, or the like. The control section 2 holds the program code of the resident application that was already being executed when the state was transferred to the rest state. Therefore, in the case of a state transition from the rest state to the non-active state, processing for reading again from the start of the program code is not required. As a result of this, the time required to revert to the resident application is shortened compared to cases where the temporarily halted resident application is restarted. It is also possible for the state transition at T4 to be executed by the control section 2 in accordance with a function contained in the resident application. Alternatively, the state transition at T4 may be executed by the control section 2 on the basis of an execution state switching instruction from the input section 3.

The detailed behaviour of the resident application after the state transition at T4 is as follows. Namely, in a ticker display, the scrolling text will restart from the display state which was halted when the execution state was transferred. In HTTP communications, the communications are restarted. If exception processing was generated when the communications were disconnected, then execution is restarted from the exception processing. The scratchpad reverts to a state where writing and reading of data can be performed. A vibrator operation halted by a rest state is not restarted automatically. Playing back of media resources and timer operation are not restarted. Switching on and switching off of the backlight are conducted similarly to the rest state. In other words, if the backlight was switched on in the rest state, then it remains switched on, and if the backlight was switched off in the rest state, then it remains switched off.

The state transition from rest state to active state (T5) is executed by the control section 2 on the basis of an execution state switching instruction from the input section 3. The control section 2 holds the program code of the resident application that was already executed when the transition to rest state was made in the RAM 4. Therefore, when the state transition from the rest state to the active state is made, processing for reading out again from the start of the program code is not necessary. As a result of this, the time required to revert to the resident application is shortened compared to cases where the temporarily halted resident application is restarted. Moreover, the state transition at T5 may also be executed by the control section 2 in accordance with a function contained in the resident application.

The detailed behaviour of the resident application after the state transition at T5 is as follows. Namely, in a ticker display, the scrolling text will restart from the display state which was halted when the execution state was transferred. In HTTP communications, the communications are restarted. If exception processing was generated when the communications were disconnected, then execution is restarted from the exception processing. The scratchpad reverts to a state where writing and reading of data can be performed. A vibrator operation halted by a rest state is not restarted automatically. Playing back of media resources and timer operation are not restarted. Switching on and switching off of the backlight are conducted similarly to the rest state. In other words, if the backlight was switched on in the rest state, then it remains switched on, and if the backlight was switched off in the rest state, then it remains switched off.

The resident application does not make a state transition from the active state to the rest state for the following reasons. Namely, when the resident application performs an execution state transition, then if an application (rogue application) has been created which always sets the resident application to a rest state, the user will become unable to control the execution state. Therefore, state transitions from the active state to the rest state are prohibited.

State transitions based on functions previously included in the resident application are essentially determined by the resident application and do not give rise to problems of the kind described above. Therefore, state transitions of this kind may be executed as exceptions, regardless of whether or not there is a corresponding instruction from the input section 3. Thereby, if the execution state is transferred on the basis of an instruction from the input section 3, it is possible to save power in a precise manner according to the wishes of the user. Furthermore, if the execution state is transferred in accordance with a function contained in a resident application, then it is possible to prevent the wasteful power consumption of the mobile telephone 1 over a long time, without an instruction from the input section 3.

Furthermore, similarly to T6-T8, in any one of the execution states, namely, the non-active state, active state or rest state, the control section 2 can terminate the resident application in accordance with a shutdown instruction from the input section 3 (S5).

The resident application can also be terminated forcibly by means of an operation by the user. In the case of forced termination, the control section 2 causes the display section 5 to display a confirmation screen. On this confirmation screen, the user is able to select a desired instruction from the following three types of instructions. Namely, the user can select a desired instruction from: (1) an instruction for terminating the resident application and cancelling the standby start-up setting, (2) an instruction for cancelling the forced termination and continuing execution of the resident application, and (3) an instruction for temporarily closing down and then restarting the resident application.

FIG. 3A shows one example of a display screen prior to key input in an active state. As shown in FIG. 3A, display data 51 indicating changes in stock prices is shown on the display section 5. The display data 51 is moving image data that is updated automatically at prescribed intervals (for example, every 10 seconds). The display data 51 comprises a designated stock input region 51a in the lower part of the screen. The designated stock input region 51a is used to input a number for identifying the stock required by a user in monitoring changes in stock prices (hereinafter, called "designated stock number").

When the display data 51 is shown, and the user inputs numerical data, such as "12345678", as a designated stock number, to the designated stock input region 51a, then the display state illustrated by the display data 52 in FIG. 3B will be obtained. In other words, in the active state, since normal key inputs are accepted, the control section 2 will execute processing for displaying the input data in the prescribed region of the display section 5, in accordance with key events received from the input section 3.

FIG. 4A is a diagram showing one example of a display screen before key input in a non-active state. As shown in FIG. 4A, display data 53 indicating changes in stock prices is shown on the display section 5. The display data 53 is moving image data that is updated automatically at prescribed intervals (for example, every 10 seconds). The display data 53 comprises a designated stock input region 53a in the lower part of the screen. In the non-active state, the control section 2 only displays the resident application and does not accept key events. Therefore, the designated stock number cannot be input to the designated stock input region 53a.

When the display data 53 is displayed, if the user performs a key operation which calls up a function for making a telephone call, then the display data 54 illustrated in FIG. 4B is shown on the display section 5. In other words, in the non-active state, key input to the resident application is refused, and key input to the native application is permitted. Therefore, in response to key events receive from the input section 3, the control section 2 executes processing for reading out display data for an outgoing call screen, from the memory section 6, and displaying same. As a result, an outgoing call screen as illustrated in FIG. 4B is displayed on the display section 5.

FIG. 5A shows one example of a display screen immediately prior to transition to a rest state. As illustrated in FIG. 5A, display data 55 indicating changes in stock prices is shown on the display section 5. In the execution state before transferring to the rest state (in other words, the non-active state or active state), the display data 55 is updated automatically at prescribed time intervals (for example, every 10 seconds).

Even if a function is executed and the resident application is transferred to a rest state whilst the display data 55 is being shown, the display data 55 immediately before this transition continues to be shown after the transition. FIG. 5B shows one example of a display screen after transferring to a rest state. In the rest state, the control section 2 continues to display the same display data 56 as the display data 55 at the time of the transition to the rest state, on the display section 5. In other words, the control section 2 does not accept key events from the input section 3 and does not perform update processing for the display data. Consequently, the power consumption of the mobile telephone 1 in the rest state is lower than in the non-active state.

As described above, according to the mobile telephone 1 of the present embodiment, the control section 2 controls switching between a normal execution state in which display data is displayed in an updateable fashion, and a rest state in which a resident application is temporarily halted. Since the application program is not closed down when in the reset state, it is possible to return to the normal execution state without requiring operations or time for restarting the application. Moreover, in the rest state, the power consumption of the mobile telephone 1 is lower than in a normal execution state. Consequently, power consumption can be reduced whilst maintaining the convenience of use.

Furthermore, in contrast to control implemented via the OS, the execution state of the resident application is controlled in accordance with a function contained in the resident application itself. Therefore, the resident application is not halted or closed down, irrespectively of the execution state thereof. Moreover, in contrast to a case where the application is transferred to a power saving state by the OS, it is possible for the resident application to return from the rest state, independently.

This embodiment of the present invention is one preferred example of a mobile telephone 1 relating to the present invention, and the present invention is not limited to this embodiment.

For example, the aforementioned embodiment may be implemented as follows. Namely, read out is permitted in the active state with respect to a portion of the functions contained in the resident application, and read out is prohibited, or read out is permitted but execution is prohibited, with respect to said portion of functions, in the non-active state. Below, these functions are called "specific functions".

Thereby, the following merits are obtained when the function indicating use of the backlight is set as a specific function, for example. Namely, in the active state, since the resident application accepts key inputs, user input operations can be facilitated by using the backlight to brighten the display screen. However, in the non-active state, since key inputs to the resident application are refused, there is little need to brighten the display screen. If reading of functions instructing use of the backlight is permitted even in this case, then it is possible that the backlight may light up against the user's wishes, due to malfunction or roguery. Therefore, by prohibiting read out of functions instructing the use of the backlight when in the non-active state, it is possible to prevent wasteful power consumption, in advance.

As specific functions, besides functions instructing use of the backlight, it is also possible to specify, for example, functions which prompt the user for text input, functions which instruct external transmission of data, functions which play a incoming call melody, functions which instruct start-up of a browser, functions for accessing the network, functions for calling up telephone functions, and the like.

Moreover, the foregoing embodiment was described with respect to the example of a mobile telephone as a mobile communications terminal, but the present invention can also be applied to information equipment, such as PHS (Personal Handyphone System), PDA (Personal Digital Assistance), and the like.

Finally, a computer-readable storage medium on which an application program 61 relating to the present invention is stored (hereinafter, simply called "storage medium") will be described. Here, a storage medium is a medium which generates a varying state of energy, such as magnetism, light, electricity, or the like, in accordance with the contents of a program, for a reading device provided in a hardware resource, such as generic computers, or the like, whereby the contents of the program can be transmitted to the reading device in a corresponding signal format. Examples of such a storage medium include not only media which are insertable in a computer, such as magnetic disks, optical disks, and magneto-optical disks, but also hard disks (HD) built permanently into a computer or a non-volatile semiconductor memory, such as integrally fitted firmware, or the like.

Figure 6:
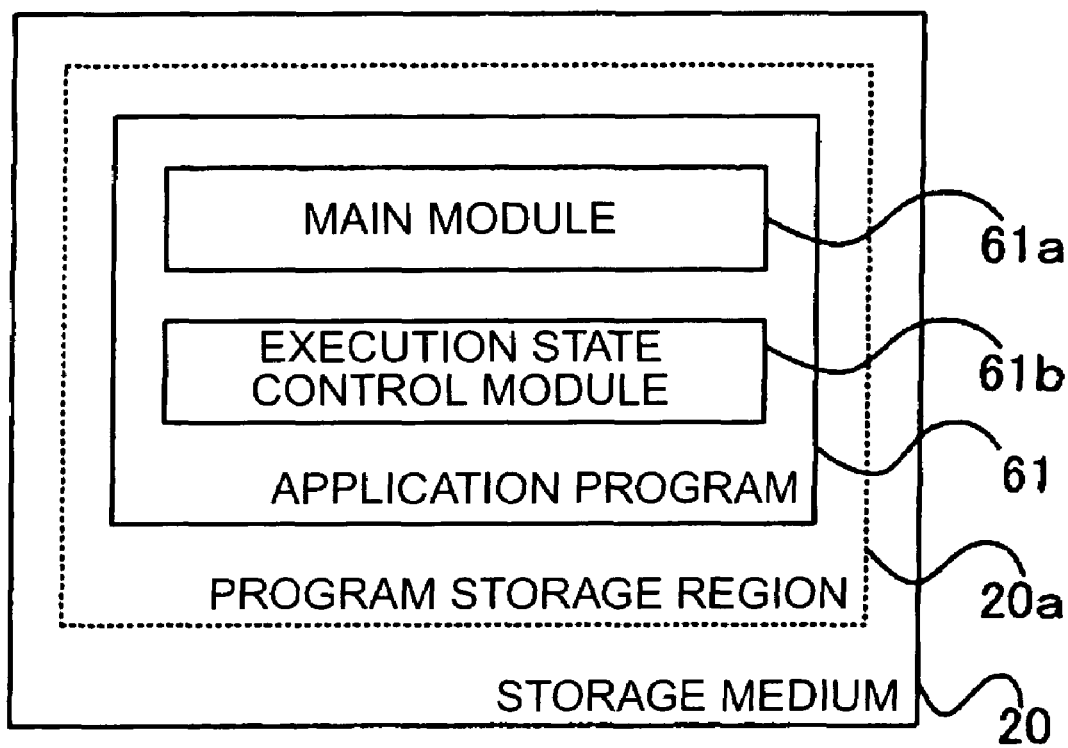
FIG. 6 is a compositional diagram of a storage medium.

FIG. 6 is a compositional diagram of a storage medium relating to the present embodiment. The storage medium 20 is, for example, an optical disk, such as a CD (Compact Disk), magnetic disk, such as a floppy disk (FD), or magneto-optical disk (MO), or the like. The storage medium 20 comprises a program storage region 20a for storing programs. As shown in FIG. 6, an application program 61 is stored in this program storage region 20a.

As shown in FIG. 6, the application program 61 is constituted by a main module 61a for controlling processing, and an execution state control module 61b for executing processing for switching between a non-active state for refusing key inputs during execution and a rest state which is a temporarily halted state. Furthermore, the execution state control module 61b performs processing for switching the execution state between a non-active state and a rest state, in accordance with state transition instructions between a non-active state and a rest state. Moreover, the execution state control module 61b performs processing for switching the execution state between a non-active state and a rest state, in accordance with functions.

Figure 7:
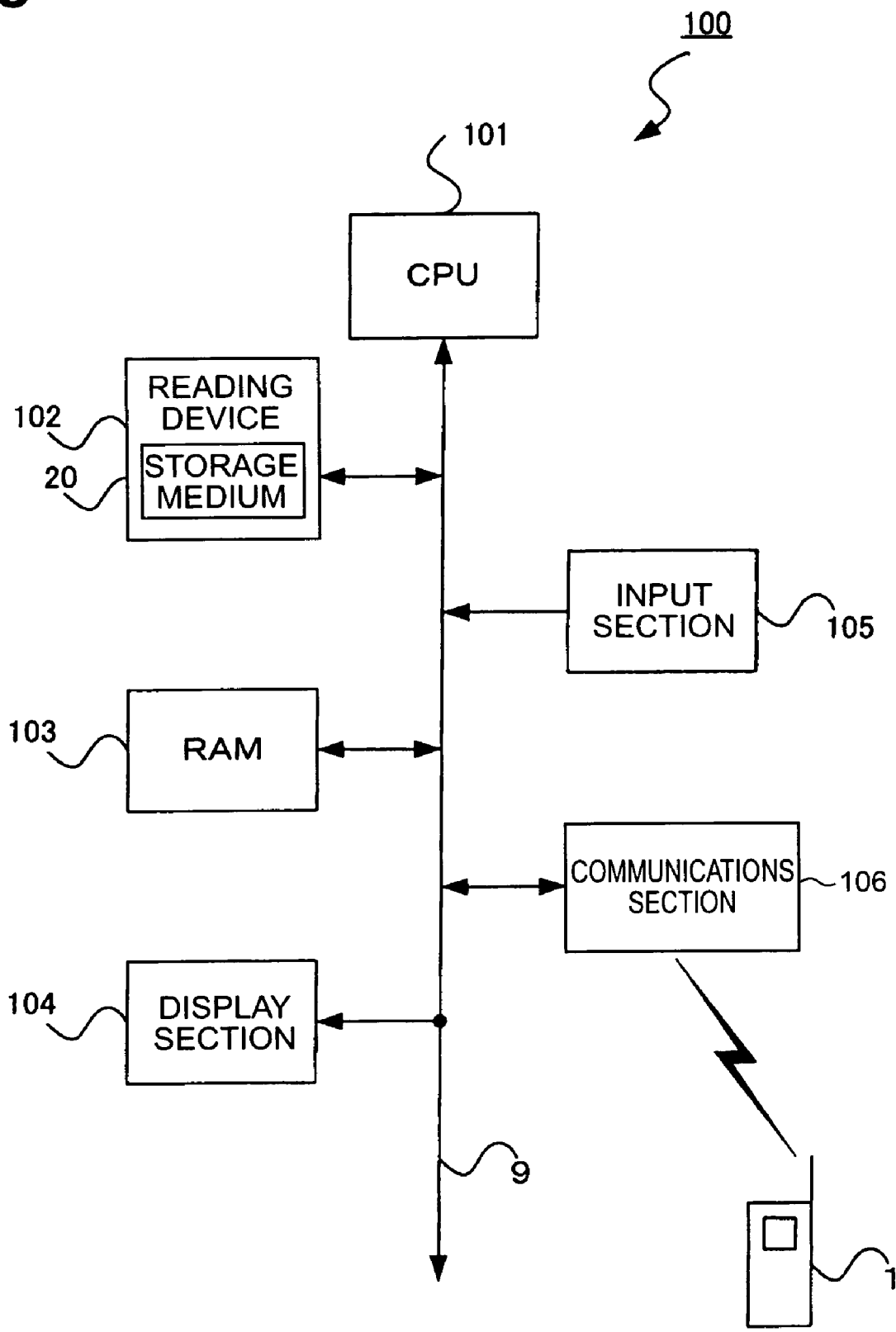
FIG. 7 is a compositional diagram of a computer system.

FIG. 7 is a block diagram showing the composition of a computer for sending an application program 61 stored on a storage medium 20 to the mobile telephone 1 (for example, a server device). As shown in FIG. 7, the computer 100 comprises a CPU 101, reading device 102, RAM (Random Access Memory) 103, which is a volatile semiconductor memory in which an OS (Operating System) is resident, a display section 104, such as a display, an input section 105, such as a mouse, keyboard, or the like, and a communications section 106, such as a communications board, or the like. Here, when a storage medium 20 is inserted into the reading device 102, the information recorded on the storage medium 20 can be accessed via the reading device 102. The application program 61 stored in the program storage region 20a of the storage medium 20 is transmitted from the call section 106 to the mobile telephone 1, and can be executed by the mobile telephone 1.

Moreover, a composition may be adopted wherein the a part or all of the application program 61 is received and stored by the radio communications section 7, from another device, via a transmission medium, such as a communications circuit, or the like. Conversely, it is also possible to adopt a composition wherein the application program 61 is transmitted via a transmission medium and installed in another device.

INDUSTRIAL APPLICABILITY

According to the present invention, it is possible to perform control for switching between a non-active state for refusing key inputs to an application program being executed and a rest state for temporarily halting the aforementioned application program. Since an application program in a rest state is not closed down, it can be returned to a non-active state which permits updating of display data, without requiring labour or time for restarting the application program. Moreover, in the rest state, the power consumption of the mobile communications terminal is lower than in the non-active state. Therefore, power consumption can be reduced whilst maintaining the convenience of use of the mobile communications terminal.

The invention claimed is:

1. A mobile communications terminal, comprising:
   a controller configured to control switching between an active state of an application program, a non-active state of the application program, and a rest state of the application program; and
   an input unit configured to instruct a state transition between said active state, said non-active state and said rest state, wherein said controller executes control for switching the execution state of said application program between the active state, non-active state and the rest state, in accordance with instructions from said input unit, wherein, in the active state of the application program, the application program is executed and permitted to process data inputted by a key and a native application program that controls a communication function of the mobile communication terminal is not permitted to process the data inputted by the key, in the non-active state of the application program, the application program is executed and not permitted to process data inputted by the key and the native application program that controls the communication function of the mobile communication terminal is permitted to process the data inputted by the key, and in the rest state of the application program, the application program is halted and not permitted to process data inputted by the key and the native application program that controls the communication function of the mobile communication terminal is permitted to process the data inputted by the key.

2. The mobile communications terminal according to claim 1, wherein said controller is configured to switch the execution state of said application program in accordance with a function contained in said application program.

3. A method executed, by mobile communications terminal controls the execution state of an application program stored in said mobile communications terminal, comprising:

controlling the mobile communications terminal to switch between an active state of said application program, a non-active state of said application program, and a rest state of said application program with a controller of the mobile communication terminal; and an instructing a state transition of said mobile communications terminal between said active state, said non-active state and said rest state through an input unit of the mobile communications terminal, wherein, said controlling is executed for switching the execution state of said application program between the active state, the non-active state and the rest state, in accordance with said instructing, in the active state of the application program, the application program is executed and permitted to process data inputted by a key and a native application program that controls a communication function of the mobile communication terminal is not permitted to process the data inputted by the key, in the non-active state of the application program, the application program is executed and not permitted to process data inputted by the key and the native application program that controls the communication function of the mobile communication terminal is permitted to process the data inputted by the key, and in the rest state of the application program, the application program is halted and not permitted to process data inputted by the key and the native application program that controls the communication function of the mobile communication terminal is permitted to process the data inputted by the key.

4. A method according to claim 3, wherein, said controlling includes switching the execution state of said application program between the active state, the non-active state and the rest state, in accordance with a function contained in said application program.

5. A tangible computer readable storage medium encoded with instructions which when executed by a mobile communications terminal including an application program, causes said mobile communications terminal to implement a method comprising:

switching between an active state of said application program, a non-active state of said application program and a rest state of said application program with a controller of the mobile communication terminal; and switching between the active state, the non-active state and the rest state, on the basis of state transition instructions input from an external source, wherein in the active state of the application program, the application program is executed and permitted to process data inputted by a key and a native application program that controls a communication function of the mobile communication terminal is not permitted to process the data inputted by the key, in the non-active state of the application program, the application program is executed and not permitted to process data inputted by the key and the native application program that controls the communication function of the mobile communication terminal is permitted to process the data inputted by the key, and in the rest state of the application program, the application program is halted and not permitted to process data inputted by the key and the native application program that controls the communication function of the mobile communication terminal is permitted to process the data inputted by the key.

6. The mobile communications terminal according to claim 1, wherein an execution state immediately after start up is the non-active state.

7. The mobile communications terminal according to claim 6, wherein a state transition from the non-active state to the active state is executed on the basis of an execution state switching instruction.

8. The mobile communications terminal according to claim 6, wherein a state transition from the active state to the non-active state is performed on the basis of a function contained in the application program.

9. The mobile communications terminal according to claim 6, wherein a state transition from the non-active state to the rest state is executed on the basis of a function contained in the application program.

10. The mobile communications terminal according to claim 6, wherein a state transition from the rest state to the non-active state is executed when a prescribed condition is satisfied.

11. The mobile communications terminal according to claim 10, wherein the prescribed condition includes:

opening a call section of the casing of a mobile telephone;

elapsing of a rest time set in the active state; and reaching a set time according to a timer.

12. The mobile communications terminal according to claim 6, wherein a state transition from the rest state to the active state is executed on the basis of an execution state switching instruction.

13. The mobile communications terminal according to claim 6, wherein a termination of the application in the non-active state occurs in accordance with a shutdown instruction.

14. The mobile communications terminal according to claim 6, wherein a termination of the application in the active state occurs in accordance with a shutdown instruction.

15. The mobile communications terminal according to claim 6, wherein a termination of the application in the rest state occurs in accordance with a shutdown instruction.

16. The mobile communication terminal of claim 1, wherein a transition from the active state directly to the rest state is prohibited.

17. The method of claim 3, wherein a transition from the active state directly to the rest state is prohibited.

18. The tangible computer readable storage medium of claim 5, wherein a transition from the active state directly to the rest state is prohibited.

19. The mobile communication terminal of claim 1, wherein in the rest state of the application program, the application program is not permitted to perform update processing of display data.

20. The method of claim 3, wherein in the rest state of the application program, the application program is not permitted to perform update processing of display data.

21. The tangible computer readable storage medium of claim 5, wherein in the rest state of the application program, the application program is not permitted to perform update processing of display data.

* * * * *